US012049603B2

(12) United States Patent
Billiauw et al.

(10) Patent No.: US 12,049,603 B2
(45) Date of Patent: *Jul. 30, 2024

(54) LIQUID HAND DISHWASHING CLEANING COMPOSITION

(71) Applicant: The Procter & Gamble Company, Cincinnati, OH (US)

(72) Inventors: Jan Julien Marie-Louise Billiauw, Gentbrugge (BE); Karl Ghislain Braeckman, Gerpinnes (BE); Katrien Richarde Francoise Decraene, Ghent (BE); Pieter Jan Maria Saveyn, Heusden (BE); Bjorn Vanoverstraete, Melle (BE)

(73) Assignee: The Procter & Gamble Company, Cincinnati, OH (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/477,571

(22) Filed: Sep. 17, 2021

(65) Prior Publication Data

US 2022/0081645 A1 Mar. 17, 2022

(30) Foreign Application Priority Data

Sep. 17, 2020 (EP) .................................... 20196751
Jun. 17, 2021 (EP) .................................... 21180079

(51) Int. Cl.

| | |
|---|---|
| ***C11D 1/14*** | (2006.01) |
| ***C11D 1/66*** | (2006.01) |
| ***C11D 1/88*** | (2006.01) |
| ***C11D 1/94*** | (2006.01) |
| ***C11D 3/22*** | (2006.01) |
| ***C11D 3/37*** | (2006.01) |
| ***C11D 17/08*** | (2006.01) |
| *C11D 1/72* | (2006.01) |
| *C11D 1/75* | (2006.01) |
| *C11D 1/90* | (2006.01) |

(52) U.S. Cl.

CPC ................ *C11D 1/94* (2013.01); *C11D 1/662* (2013.01); *C11D 3/3707* (2013.01); *C11D 17/08* (2013.01); *C11D 1/146* (2013.01); *C11D 1/72* (2013.01); *C11D 1/75* (2013.01); *C11D 1/90* (2013.01); *C11D 2111/14* (2024.01)

(58) Field of Classification Search

CPC ........... C11D 1/14; C11D 1/146; C11D 1/662; C11D 1/665; C11D 1/88; C11D 3/2041; C11D 3/2048; C11D 3/22

See application file for complete search history.

(56) References Cited

U.S. PATENT DOCUMENTS

| | | | | |
|---|---|---|---|---|
| 5,238,609 | A * | 8/1993 | Smith | C11D 1/83 510/423 |
| 7,939,487 | B2 | 5/2011 | Scheuing et al. | |
| 8,114,826 | B1 * | 2/2012 | Hermanson | C11D 3/3707 510/389 |
| 11,447,721 | B2 | 9/2022 | Billiauw et al. | |
| 11,530,370 | B2 | 12/2022 | Billiauw et al. | |
| 2011/0152158 | A1 | 6/2011 | Bettiol et al. | |
| 2012/0071379 | A1 | 3/2012 | Gonzales et al. | |
| 2012/0071380 | A1 | 3/2012 | Gonzales et al. | |
| 2013/0072414 | A1 | 3/2013 | Price et al. | |
| 2013/0072416 | A1 | 3/2013 | Price et al. | |
| 2017/0044466 | A1 * | 2/2017 | van Buskirk | C11D 1/662 |
| 2017/0137745 | A1 | 5/2017 | Tang | |
| 2018/0303090 | A1 | 10/2018 | Budhian et al. | |
| 2020/0181532 | A1 | 6/2020 | Renmans | |
| 2021/0395643 | A1 | 12/2021 | Biiliauw et al. | |

FOREIGN PATENT DOCUMENTS

| | | | |
|---|---|---|---|
| DE | 102006017311 | A1 | 10/2007 |
| DE | 102016114673 | A1 | 2/2018 |
| EP | 0466243 | A1 | 1/1992 |
| EP | 2264136 | A1 | 12/2010 |
| EP | 2336282 | A1 | 6/2011 |
| EP | 3456805 | A1 | 3/2019 |
| EP | 3633016 | A1 | 4/2020 |
| JP | H11507956 | A | 7/1999 |
| JP | H11302683 | A | 11/1999 |
| JP | 2001520269 | A | 10/2001 |
| JP | 2002226891 | A | 8/2002 |
| JP | 2002294298 | A | 10/2002 |
| JP | 2004051958 | A | 2/2004 |
| JP | 2005171129 | A | 6/2005 |

(Continued)

OTHER PUBLICATIONS

"ThermoFisher Scientific Safety Data Sheet for Polypropylene Glycol 1000", dated Oct. 7, 2010, pp. 1-6, Revision No. 2.*
Extended European Search Report and Search Opinion; Application No. 21180079.2; dated Nov. 26, 2021, 7 pages.
Extended European Search Report and Search Opinion; Application No. 21180093.3; dated Nov. 29, 2021, 6 pages.
All Office Actions; U.S. Appl. No. 17/477,566, filed Sep. 17, 2021.
All Office Actions; U.S. Appl. No. 17/477,568, filed Sep. 17, 2021.
All Office Actions; U.S. Appl. No. 17/477,570, filed Sep. 17, 2021.
All Office Actions; U.S. Appl. No. 17/477,572, filed Sep. 17, 2021.

(Continued)

*Primary Examiner* — Brian P Mruk
(74) *Attorney, Agent, or Firm* — Carolyn S. Powell

(57) ABSTRACT

The need for a hand-dishwashing composition which is highly effective at removing grease, while also having good suds mileage, and avoiding negatives on physical stability, especially at low temperatures is met by formulating the hand dishwashing composition to comprise a surfactant system, the surfactant system comprising an alkyl sulfate anionic surfactant comprising little or no branching and having a low degree of alkoxylation, or no alkoxylation, and a co-surfactant, in combination with polypropylene glycol of a defined molecular weight, as described herein.

15 Claims, No Drawings

(56) References Cited

FOREIGN PATENT DOCUMENTS

| | | | |
|---|---|---|---|
| JP | 2005171131 | A | 6/2005 |
| JP | 2007016131 | A | 1/2007 |
| JP | 2009144023 | A | 7/2009 |
| JP | 2013082846 | A | 5/2013 |
| JP | 2013082847 | A | 5/2013 |
| JP | 2014196514 | A | 10/2014 |
| JP | 2015500890 | A | 1/2015 |
| JP | 2016503124 | A | 2/2016 |
| JP | 2017078098 | A | 4/2017 |
| JP | 2017110215 | A | 6/2017 |
| JP | 2017515947 | A | 6/2017 |
| JP | 2018517820 | A | 7/2018 |
| JP | 2020059843 | A | 4/2020 |
| JP | 2020196810 | A | 12/2020 |
| WO | 9416042 | A1 | 7/1994 |
| WO | 9739088 | A1 | 10/1997 |
| WO | 9800488 | A1 | 1/1998 |
| WO | 9919448 | A1 | 4/1999 |
| WO | 9919449 | A1 | 4/1999 |
| WO | 0042155 | A1 | 7/2000 |
| WO | 0077142 | A1 | 12/2000 |
| WO | 2009143091 | A1 | 11/2009 |
| WO | 2010027608 | A2 | 3/2010 |
| WO | 2017079960 | A1 | 5/2017 |
| WO | 2017097913 | A1 | 6/2017 |

OTHER PUBLICATIONS

All Office Actions; U.S. Appl. No. 17/477,575, filed Sep. 17, 2021.

All Office Actions; U.S. Appl. No. 17/477,581, filed Sep. 17, 2021.

All Office Actions; U.S. Appl. No. 17/477,582, filed Sep. 17, 2021.

Extended European Search Report and Search Opinion; Application No. 20196751.0; dated Mar. 2, 2021; 8 pages.

Sasol's Alcohol Portfolio Synthetic and Natural Alcohols, Sasol, Retrieved from the Internet: URL:http://sasolnorthamerica.com/Images/Interior/productsearchdocuments/sasolalcoholportfoliotechbulletin.pdf, Aug. 15, 2013, pp. 1-2.

Unpublished U.S. Appl. No. 17/477,566, filed Sep. 17, 2021, to first inventor et al.

Unpublished U.S. Appl. No. 17/477,568, filed Sep. 17, 2021, to first inventor et al.

Unpublished U.S. Appl. No. 17/477,570, filed Sep. 17, 2021, to first inventor et al.

Unpublished U.S. Appl. No. 17/477,572, filed Sep. 17, 2021, to first inventor et al.

Unpublished U.S. Appl. No. 17/477,575, filed Sep. 17, 2021, to first inventor et al.

Unpublished U.S. Appl. No. 17/477,581, filed Sep. 17, 2021, to first inventor et al.

Unpublished U.S. Appl. No. 17/477,582, filed Sep. 17, 2021, to first inventor et al.

* cited by examiner

LIQUID HAND DISHWASHING CLEANING COMPOSITION

FIELD OF THE INVENTION

The present invention relates to a liquid hand dishwashing cleaning composition.

BACKGROUND OF THE INVENTION

Hand-dishwashing cleaning compositions are formulated to be highly effective at removing grease from soiled dishes. Formulating the detergent composition using alkyl sulfate surfactant having little or no alkoxylation has been found to result in improved grease removal. However, the improved grease removal typically leads to reduced suds mileage, especially under dilute wash conditions. Such dilute wash conditions are for instance faced by the users when washing dishes by submersing in a sink filed with a wash liquor comprising a detergent composition. Since suds mileage is a key indicator for users of lasting efficacy, poor suds mileage can lead to over usage of the detergent composition and hence less satisfaction from users. Indeed, hand dishwashing cleaning compositions have typically been formulated using alkoxylated alkyl surfactants such as alkyl ether sulfate surfactants as the main anionic surfactant, since such alkoxylated anionic surfactants provide more robust sudsing in the presence of grease.

Hand dishwashing cleaning compositions have also typically been formulated using alkoxylated alkyl surfactants such as alkyl ether sulfate surfactants as the primary anionic surfactant, since detergent compositions comprising non-alkoxylated alkyl sulfate surfactants are typically less physically stable, especially at lower temperatures. Indeed, high levels of solvents have typically been required in order to provide such detergent compositions with acceptable physical stability.

Hence, a need remains for a hand-dishwashing composition which is highly effective at removing grease, especially when used under dilute wash conditions, while also having good suds mileage, and avoiding negatives on physical stability, especially at low temperatures.

EP0466243A1 relates to a process for preparing secondary alkyl sulfate-containing surface active compositions substantially free of unreacted organic matter and water. EP3374486A1 relates to cleaning compositions with improved sudsing profiles, which contain one or more branched and unalkoxylated C6-C14 alkyl sulfate anionic surfactants in combination with one or more linear or branched C4-C11 alkyl or aryl alkoxylated alcohol nonionic surfactants, such cleaning compositions are particularly suitable for use in hand-washing fabrics. WO2017079960A1 relates to cleaning compositions with improved sudsing profiles, which contain the combination of one or more branched, unethoxylated C6-C14 alkyl sulfate surfactants with one or more linear, unalkoxylated C6-C18 alkyl sulfate surfactants, such cleaning compositions are particularly suitable for hand-washing dishes or fabrics. WO2009143091A1 relates to a light duty liquid detergent composition that includes a C14-C15 alcohol and alcohol ethoxylate sulfate surfactant blend as an efficient and effective foaming agent, the surfactant-based product may be a hand dishwashing liquid, a liquid skin cleanser or any type of cleaning or cleansing product based on surfactants, the light duty liquid detergent composition includes an anionic sulfonate surfactant, an amine oxide, a C14-C15 alcohol sulfate, and a C14-C15 alcohol ethoxylate sulfate. WO2017097913A1 relates to a dishwashing detergent composition, including an alkyl sulfate having a branched chain, wherein the refractive index of the dishwashing detergent composition is 0.10 or more to 0.30 or less; the viscosity of the dishwashing detergent composition is 800 mPa-s or more to 1800 mPa-s or less; and the dishwashing detergent composition includes the alkyl sulfate in a content of 0.1% by mass or more to 4.0% by mass or less, based on the total amount of the dishwashing detergent composition. WO2017079958A1 relates to cleaning compositions with improved sudsing profiles, which contain one or more branched and unalkoxylated C6-C14 alkyl sulfate anionic surfactants in combination with one or more linear or branched C4-C11 alkyl or aryl alkoxylated alcohol nonionic surfactants, such cleaning compositions being particularly suitable for use in hand-washing fabrics. WO1998000488A1 relates to liquid dishwashing compositions which contain a surfactant system, a solvent to control viscosity, a hydrotrope to ensure appropriate solubility of the composition, and an effective amount of an anti-gelling polymer to inhibit gelling of the composition.

SUMMARY OF THE INVENTION

The present invention relates to a liquid hand dishwashing cleaning composition comprising: from 5% to 50% by weight of the total composition of a surfactant system, wherein the surfactant system comprises at least 40% by weight of the surfactant system of anionic surfactant, wherein the anionic surfactant comprises at least 50% by weight of the anionic surfactant of alkyl sulfate anionic surfactant, wherein the alkyl sulfate anionic surfactant: has an alkyl chain comprising an average of from 8 to 18 carbon atoms; has an average degree of branching of less than 15%, and has an average degree of alkoxylation of less than 0.5; and a co-surfactant selected from the group consisting of an amphoteric surfactant, a zwitterionic surfactant and mixtures thereof; and from 0.1% to 10% by weight of the total composition of polypropyleneglycol, wherein the polypropyleneglycol has a weight average molecular weight from 500 g/mol to 1800 g/mol.

DETAILED DESCRIPTION OF THE INVENTION

A hand-dishwashing composition which is highly effective at removing grease, while also having good suds mileage, especially under dilute wash conditions, and avoiding negatives on physical stability, especially at low temperatures can be provided by formulating the hand dishwashing composition to comprise an alkyl sulfate anionic surfactant having a low degree of alkoxylation, or no alkoxylation, and polypropylene glycol of a defined molecular weight, as described herein.

Definitions

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high suds volume and/or sustained suds volume, particularly during a substantial portion of or for the entire manual dishwashing process. This is important as the consumer uses high suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The cleaning composition is a hand dishwashing cleaning composition in liquid form. The cleaning composition is preferably an aqueous cleaning composition. As such, the composition can comprise from 50% to 85%, preferably from 50% to 75%, by weight of the total composition of water.

The pH of the composition can be from 3.0 to 14, preferably from 6.0 to 12, more preferably from 8.0 to 10, as measured at 10% dilution in distilled water at 20° C. The pH of the composition can be adjusted using pH modifying ingredients known in the art.

The composition of the present invention can be Newtonian or non-Newtonian, preferably Newtonian. Preferably, the composition has a viscosity of from 50 mPa-s to 5,000 mPa-s, more preferably from 300 mPa-s to 2,000 mPa-s, or most preferably from 500 mPa-s to 1,500 mPa-s, alternatively combinations thereof.

Surfactant System

The cleaning composition comprises from 5% to 50%, preferably from 8% to 45%, more preferably from 15% to 40%, by weight of the total composition of a surfactant system.

For improved sudsing, the surfactant system comprises at least 40%, preferably from 45% to 90%, more preferably from 50% to 80% by weight of the surfactant system of the anionic surfactant. The anionic surfactant comprises at least 50%, preferably at least 70%, more preferably at least 90% by weight of the anionic surfactant of alkyl sulfate anionic surfactant. Most preferably, the anionic surfactant consists of alkyl sulfate surfactant, most preferably primary alkyl sulfate anionic surfactant. As such, while the surfactant system may comprise small amounts of further anionic surfactant, including sulfonates such as HLAS, or sulfosuccinate anionic surfactants, the surfactant system preferably comprises no further anionic surfactant beyond the alkyl sulfate anionic surfactant.

The alkyl sulfate anionic surfactant has an alkyl chain comprising an average of from 8 to 18 carbon atoms, preferably from 10 to 14 carbon atoms, more preferably from 12 to 13 carbon atoms.

The alkyl chain of the alkyl sulfated anionic surfactant preferably has a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 50/50, preferably from 60/40 to 80/20, most preferably from 60/40 to 70/30, while not compromising suds mileage in the presence of particulate soils.

The alkyl sulfate anionic surfactant comprises alkyl chains which are essentially linear or even fully linear. As such, the alkyl sulfate anionic surfactant have an average degree of branching of less than 15%, preferably wherein the alkyl sulfate anionic surfactant consists of linear alkyl sulfate anionic surfactant, more preferably wherein the linear alkyl sulfate surfactant comprises alkyl chains which are naturally derived. Suitable sources of naturally derived alkyl chains are palm kernel oil or coconut oil, with palm kernel oil being preferred. The naturally derived alkyl chain can be fractionated in order to provide the desired average alkyl chain length, as well as to adjust the alkyl chain length distribution. The C12 to C14 fraction is often referred to as the mid cut fraction within the naturally derived alkyl chains. Alternatively, essentially linear alkyl chains can be synthetically derived using the Ziegler process, or a derivative thereof, a method for producing fatty alcohols from ethylene using an organoaluminium compound. The reaction produces linear primary alcohols with an even numbered carbon chain. Again the most preferred C12-C14 alkyl fraction can be fractionated out of the total Ziegler alcohol.

The alkyl sulfate anionic surfactant has an average degree of alkoxylation of less than 0.5, preferably less than 0.25, more preferably less than 0.1, and most preferably, the alkyl sulfate anionic surfactant is free of alkoxylation. As such, the alkyl sulfate surfactant comprises less than 10% preferably less than 5% by weight of the alkyl sulfate anionic surfactant of an alkoxylated alkyl sulfate surfactant, more preferably wherein the alkyl sulfate anionic surfactant is free of an alkoxylated alkyl sulfate surfactant. If alkoxylated, the alkyl sulfated anionic surfactant is preferably ethoxylated.

The average degree of alkoxylation is the mol average degree of alkoxylation (i.e., mol average alkoxylation degree) of all the alkyl sulfate anionic surfactant. Hence, when calculating the mol average alkoxylation degree, the mols of non-alkoxylated sulfate anionic surfactant are included:

$$\text{Mol average alkoxylation degree}=(x1*\text{alkoxylation degree of surfactant }1+x2*\text{alkoxylation degree of surfactant }2+\ldots)/(x1+x2+\ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Detergent compositions comprising alkyl sulfate anionic surfactants having high degrees of ethoxylation have typically been more sensitive to changes in starting alcohol type used to produce the alkyl ethoxy sulfate anionic surfactant and to the type and level of solvents used in the formulation, resulting in large changes in the finished product viscosity. As such, it is often more difficult to reformulate compositions to take advantage of changes in raw material costs and/or supply availability, or in support of advertising claims around suds mileage or overall cleaning performance, while meeting the finished product viscosity requirements.

It has been found that formulating hand dishwashing compositions comprising alkyl sulfate anionic surfactant with little or no alkoxylated alkyl sulfate surfactant results in less viscosity variation with changes in type of starting alcohol for the alkyl sulfate surfactant, as well as in an improved grease cleaning performance. However, reducing the degree of alkoxylation has also been found to cause low temperature instabilities in the formulation, as well as poor suds mileage in the presence of emulsified grease.

If ethoxylated alkyl sulfate is present, without wishing to be bound by theory, through tight control of processing conditions and feedstock material compositions, both during alkoxylation especially ethoxylation and sulfation steps, the amount of 1,4-dioxane by-product within alkoxylated especially ethoxylated alkyl sulfates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulfates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

Suitable counterions for the anionic surfactant include alkali metal cation earth alkali metal cation, alkanolammonium or ammonium or substituted ammonium, but preferably sodium.

Suitable examples of commercially available alkyl sulfate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired average alkyl chain, average degree of branching and type of branching distribution according to the invention. Preferably the alkyl sulfate anionic surfactant comprises a Fischer Tropsch derived alkyl sulfate anionic surfactant, such as commercially available under the Safol brandname from the Sasol company. More preferably the alkyl sulfate anionic surfactant comprises at least 30%, preferably from 35% to 75%, more preferably from 40% to 60% by weight of alkyl sulfate anionic surfactant of a Fischer Tropsch derived alkyl sulfate anionic surfactant.

Such Fischer Tropsch alcohols as non-C2 branched alkyl sources can be complemented with OXO-process derived alcohols such as Neodol, Lial or Isalchem alcohols as C2-branched alkyl sources and/or natural mid cut fractionated alcohols to achieve the desired alkyl sulfate anionic surfactant of use in the present to the invention. Alternative C2-branched alkyl sources than or in addition to OXO-process derived alcohols are those described in applications U.S. 63/035,125 and U.S. 63/035,131. Suitable alcohol blends for alkyl sulfate anionic surfactants according to the invention include (% by weight of total alcohol blend): 50% Safol 23A, 30% Neodol 3, 20% mid-cut fractionated natural alcohol; 50% Safol 23A, 30% Neodol 3, 20% C13 alcohol as disclosed in applications U.S. 63/035,125 and U.S. 63/035,131; and 30% Safol 23A, 30% Neodol 3, 20% mid-cut fractionated natural alcohol and 20% C13 alcohol as disclosed in applications U.S. 63/035,125 and U.S. 63/035,131. Preferred mid-cut fractionated natural alcohols within these such blends are palm kernel derived alcohols. These preferred palm kernel derived mid-cut fractionated natural alcohols typically comprise about 65% C12, 29% C14 and 6% C16 alcohols by weight of the palm kernel derived mid-cut fractionated natural alcohol. Alternative suitable mid-cut fractionated alcohols are coconut derived mid-cut fractionated alcohols which have a similar alkyl chain distribution within the mid-cut fractionated alcohol to the palm kernel derived mid-cut fractionated alcohol.

Co-Surfactant

In order to improve surfactant packing after dilution and hence improve suds mileage, the surfactant system further comprises a co-surfactant.

The co-surfactant is selected from the group consisting of an amphoteric surfactant, a zwitterionic surfactant, and mixtures thereof. The co-surfactant is preferably an amphoteric surfactant, more preferably an amine oxide surfactant.

The weight ratio of anionic surfactant to the co-surfactant can be from 1:1 to 8:1, preferably from 2:1 to 5:1, more preferably from 2.5:1 to 4:1.

The surfactant system can comprise from 0.1% to 20%, preferably from 0.5% to 15%, more preferably from 2% to 10% by weight of the cleaning composition of the co-surfactant. The surfactant system of the cleaning composition of the present invention can comprise from 10% to 40%, preferably from 15% to 35%, more preferably from 20% to 30%, by weight of the surfactant system of the co-surfactant.

The amine oxide surfactant can be linear or branched, though linear are preferred. Suitable linear amine oxides are typically water-soluble, and characterized by the formula R1-N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred. Preferably, the alkyl chain of the alkyl dimethyl amine oxide is a linear alkyl chain, preferably a C12-C14 alkyl chain, more preferably a C12-C14 alkyl chain derived from coconut oil or palm kernel oil.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the $\alpha$ carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that |n1-n2 is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from 1 to 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from 10% to 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof.

In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the Phosphobetaine, and preferably meets formula (I):

$$R^1-[CO-X(CH_2)_n]_x-N+(R^2)(R_3)-(CH_2)_m-[CH(OH)-CH_2]_y-Y^-$$

wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, S03, OPO(OR5)O or P(O)(OR5)O, wherein R5 is H or a C1-4 alkyl residue.

Preferred betaines are the alkyl betaines of formula (IIa), the alkyl amido propyl betaine of formula (IIb), the sulphobetaines of formula (IIc) and the amido sulphobetaine of formula (IId):

$$R^1-N^+(CH_3)_2-CH_2COO^- \quad (IIa)$$

$$R^1-CO-NH-(CH_2)_3-N^+(CH_3)_2-CH_2COO^- \quad (IIb)$$

$$R^1-N^+(CH_3)_2-CH_2CH(OH)CH_2SO_3^- \quad (IIc)$$

$$R^1-CO-NH-(CH_2)_3-N+(CH_3)_2-CH_2CH(OH)CH_2SO_3^- \quad (IId)$$

in which R1 has the same meaning as in formula (I). Particularly preferred are the carbobetaines [i.e. wherein $Y^-{=}COO-$ in formula (I)] of formulae (IIa) and (IIb), more preferred are the alkylamidobetaine of formula (IIb).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

The surfactant system can comprise a nonionic surfactant. It is believed that the addition of the nonionic surfactant further reduces viscosensitivity towards variations in starting alcohol in the alkyl sulfate anionic surfactant, and improved the ability to reach the desired viscosity values as well as improving low temperature stability, suds mileage and grease cleaning, which means that less branching at positions greater than C2 is required in the alkyl sulfate surfactant. As such, the addition of the nonionic surfactant enables more flexibility in the choice of starting alcohols of use to make the alkyl sulfate anionic surfactant of the present compositions.

The nonionic surfactant is preferably selected from the group consisting of: alkoxylated alkyl alcohol, alkyl polyglucoside, and mixtures thereof.

When the alkyl sulfate anionic surfactant has an average degree of branching of less than 15%, the nonionic surfactant preferably comprises alkyl polyglucoside. In such compositions, alkyl polyglucoside improves suds mileage in presence of particulate soils, while also providing a more consistent dosing experience with changes in formulation since a Newtonian viscosity plateau is maintained over a larger range of surfactant levels.

When the alkyl sulfate anionic surfactant comprises a mixture of linear and branched alkyl sulfate anionic surfactant with an average degree of branching of at least 15%, the nonionic surfactant preferably comprises alkoxylated alkyl alcohol, more preferably ethoxylated alkyl alcohol. In such compositions, low temperature stability is improved.

The surfactant system can comprise the nonionic surfactant at a level of from 1% to 25%, preferably from 1.25% to 15%, more preferably from 1.5% to 10%, by weight of the surfactant system.

Suitable alkoxylated non-ionic surfactants can be linear or branched, primary or secondary alkyl alkoxylated non-ionic surfactants. The alkoxylated nonionic surfactant can comprise on average of from 8 to 18, preferably from 9 to 15, more preferably from 10 to 14 carbon atoms in its alkyl chain.

Alkyl ethoxylated non-ionic surfactant are preferred. Suitable alkyl ethoxylated non-ionic surfactants can comprise an average of from 5 to 12, preferably from 6 to 10, more preferably from 7 to 8, units of ethylene oxide per mole of alcohol. Such alkyl ethoxylated nonionic surfactants can be derived from synthetic alcohols, such as OXO-alcohols and Fisher Tropsh alcohols, or from naturally derived alcohols, or from mixtures thereof. Suitable examples of commercially available alkyl ethoxylate nonionic surfactants include, those derived from synthetic alcohols sold under the Neodol® brand-name by Shell, or the Lial®, Isalchem®, and Safol® brand-names by Sasol, or some of the natural alcohols produced by The Procter & Gamble Chemicals company.

Suitable nonionic surfactants include alkyl polyglucoside ("APG") surfactants. Alkyl polyglucoside nonionic surfactants are typically more sudsing than other nonionic surfactants such as alkyl ethoxylated alcohols. In addition, they have been found to improve suds mileage in the presence of particulate soils.

A combination of alkyl sulfate anionic surfactant and alkylpolyglucoside nonionic surfactant has been found to also improve polymerized grease removal, suds mileage performance, reduced viscosity variation with changes in the surfactant and/or surfactant system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

The anionic surfactant and alkyl polyglucoside surfactant can be present at a weight ratio of from greater than 1:1 to 10:1, preferably from 1.5:1 to 5:1, more preferably from 2:1 to 4:1

C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulfate anionic surfactant having an average degree of branching of less than 15% and alkyl polyglucoside nonionic surfactant.

Polypropylene Glycol:

The composition comprises from 0.1% to 10%, preferably from 0.3% to 5.0%, more preferably from 0.5% to 3.0% by weight of the total composition of polypropyleneglycol. Polypropyleneglycol is also often referred to as polypropylene oxide, the polymerization product of propylene glycol).

The polypropyleneglycol has a weight average molecular weight of from 500 g/mol to 1800 g/mol, preferably from 600 g/mol to 1500 g/mol, more preferably from 700 g/mol to 1300 g/mol. The molecular weight can be determined by any suitable means, such as described in Polymer Letters, v.4, pp. 837-841 (1966), or J. Polym. Sci: Part A, v.1, pp. 1041-1048 (1963).

The polypropyleneglycol comprises, preferably consists of poly-1,2-propyleneglycol.

Polypropylene glycol can be produced through the ring-opening polymerization of propylene oxide. Suitable initiators include an alcohol with a base, such as potassium hydroxide, as a catalyst. When the initiator is ethylene glycol or water the polymer is linear. With a multifunctional initiator such as glycerine, pentaerythritol or sorbitol, the resultant polymer is branched. Linear polypropyleneglycol, especially linear poly-1,2-propyleneglycol is most preferred.

Poly-1,2-propyleneglycol of the desired molecular weight is commercially available from the Dow company under the Polyglycol P tradename. Alternatively poly-1,2-propyleneglycol of the desired molecular weight can be ordered from Sigma Aldrich.

Further Ingredients:

The composition can comprise further ingredients such as those selected from: amphiphilic alkoxylated polyalkyleneimines, cyclic polyamines, triblock copolymers, salts, hydrotropes, organic solvents, other adjunct ingredients such as those described herein, and mixtures thereof.

Amphiphilic Alkoxylated Polyalkyleneimine:

The composition of the present invention may further comprise from 0.05% to 2%, preferably from 0.07% to 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

(I)

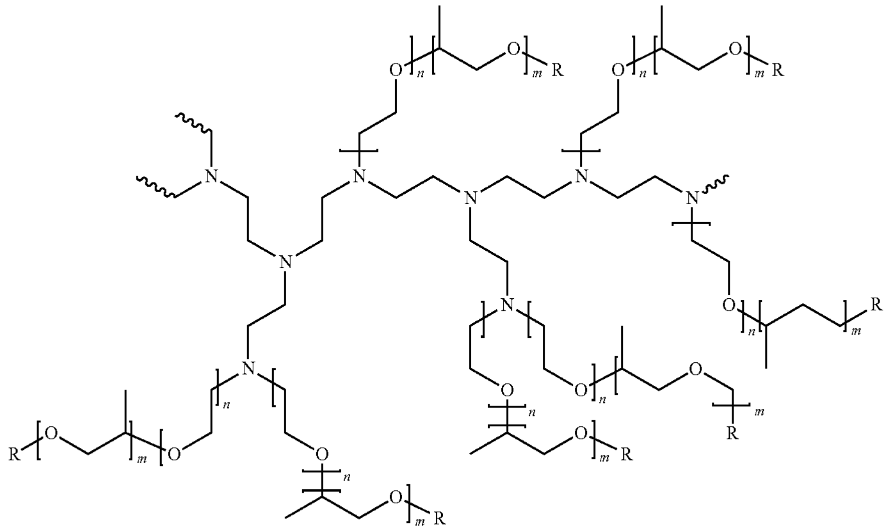

wherein the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Cyclic Polyamine

The composition can comprise a cyclic polyamine having amine functionalities that helps cleaning. The composition of the invention preferably comprises from 0.1% to 3%, more preferably from 0.2% to 2%, and especially from 0.5% to 1%, by weight of the composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Suitable cyclic polyamines can be supplied by BASF, under the Baxxodur tradename, with Baxxodur ECX-210 being particularly preferred.

A combination of the cyclic polyamine and magnesium sulphate is particularly preferred. As such, the composition can further comprise magnesium sulphate at a level of from 0.001% to 2.0%, preferably from 0.005% to 1.0%, more preferably from 0.01% to 0.5% by weight of the composition.

Triblock Copolymer

The composition of the invention can comprise a triblock copolymer. The triblock co-polymers can be present at a level of from 0.1% to 10%, preferably from 0.5% to 7.5%, more preferably from 1% to 5%, by weight of the total composition. Suitable triblock copolymers include alkylene oxide triblock co-polymers, defined as a triblock co-polymer having alkylene oxide moieties according to Formula (I): (EO)x(PO)y(EO)x, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 EO blocks of from 3:1 to 2:1. Preferably the triblock co-polymer has an average weight percentage of total EO of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the liquid hand dishwashing detergent composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic® PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

The composition of the present invention may further comprise at least one active selected from the group consisting of: salt, hydrotrope, organic solvent, and mixtures thereof.

Salt:

The composition of the present invention may comprise from 0.05% to 2%, preferably from 0.1% to 1.5%, or more preferably from 0.5% to 1%, by weight of the total composition of a salt, preferably a monovalent or divalent inorganic salt, or a mixture thereof, more preferably selected from: sodium chloride, sodium sulfate, and mixtures thereof. Sodium chloride is most preferred.

Hydrotrope:

The composition of the present invention may comprise from 0.1% to 10%, or preferably from 0.5% to 10%, or more preferably from 1% to 10% by weight of the total composition of a hydrotrope or a mixture thereof, preferably sodium cumene sulfonate.

Organic Solvent:

The composition can comprise from 0.1% to 10%, or preferably from 0.5% to 10%, or more preferably from 1% to 10% by weight of the total composition of a further organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Method of Washing

The compositions of the present invention can be used in methods of manually washing dishware. Suitable methods can include the steps of delivering a composition of the present invention to a volume of water to form a wash solution and immersing the dishware in the solution. The dishware is cleaned with the composition in the presence of water.

Typically from 0.5 mL to 20 mL, preferably from 3 mL to 10 mL of the detergent composition, preferably in liquid form, can be added to the water to form the wash liquor. The actual amount of detergent composition used will be based on the judgment of the user, and will typically depend upon factors such as the particular product formulation of the detergent composition, including the concentration of active ingredients in the detergent composition, the number of soiled dishes to be cleaned, the degree of soiling on the dishes, and the like.

The detergent composition can be combined with from 2.0 L to 20 L, typically from 5.0 L to 15 L of water to form a wash liquor, such as in a sink. The soiled dishware is immersed in the wash liquor obtained, before scrubbing the soiled surface of the dishware with a cloth, sponge, or similar cleaning implement. The cloth, sponge, or similar cleaning implement is typically contacted with the dishware for a period of time ranged from 1 to 10 seconds, although the actual time will vary with each application and user preferences.

Optionally, the dishware can be subsequently rinsed. By "rinsing", it is meant herein contacting the dishware cleaned with the process according to the present invention with substantial quantities water. By "substantial quantities", it is meant usually from 1.0 to 20 L, or under running water.

Alternatively, the composition herein can be applied in its neat form to the dishware to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Such methods of neat application comprise the step of contacting the liquid hand dishwashing detergent composition in its neat form, with the dish. The composition may be poured directly onto the dish from its container. Alternatively, the composition may be applied first to a cleaning device or implement such as a brush, a sponge, a nonwoven material, or a woven material. The cleaning device or implement, and consequently the liquid dishwashing composition in its neat form, is then directly contacted to the surface of each of the soiled dishes, to remove said soiling. The cleaning device or implement is typically contacted with each dish surface for a period of time range from 1 to 10 seconds, although the actual time of application will depend upon factors such as the degree of soiling of the dish. The contacting of said cleaning device or implement to the dish surface is preferably accompanied by concurrent scrubbing Subsequently, the dishware can be rinsed, either by submersing in clean water or under running water.

Test Methods

The following assays set forth must be used in order that the invention described and claimed herein may be more fully understood.

Suds Mileage:

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. A defined amount of a test composition, depending on the targeted composition concentration (here: 0.12 wt %), is dispensed through a plastic pipette at a flow rate of 0.67 mL/sec at a height of 37 cm above the bottom surface of a sink (dimension: 300 mm diameter and 288 mm height) into a water stream (here: water hardness: 5.34 meq/l, water temperature: 35° C.) that is filling up the sink to 4 L with a constant pressure of 4 bar.
2. An initial suds volume generated (measured as average foam height X sink surface area and expressed in $cm^3$) is recorded immediately after end of filling.
3. A fixed amount (6 mL) of soil is immediately injected into the middle of the sink.
4. The resultant solution is mixed with a metal blade (10 cm×5 cm) positioned in the middle of the sink at the air liquid interface under an angle of 45 degrees rotating at 85 RPM for 20 revolutions.
5. Another measurement of the total suds volume is recorded immediately after end of blade rotation.
6. Steps 3-5 are repeated until the measured total suds volume reaches a minimum level of 400 $cm^3$. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample.
9. Calculate a Suds Mileage Index by comparing the average mileage of a test composition sample versus a reference composition sample. The calculation is as follows:

Suds Mileage Index=(Average number of soil additions of test composition/Average number of soil additions of reference composition)×100

Soil composition is produced through standard mixing of the components described in Table 1.

TABLE 1

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% | 0.139 |
| Palmitic Acid, 99+% | 0.036 |
| Stearic Acid, 99+% | 0.021 |

Viscosity:

The viscosity is measured at 20° C. with a Brookfield RT Viscometer using spindle 31 with the RPM of the viscometer adjusted to achieve a torque of between 40% and 60%.

Example

The effect of molecular weight of the poly-1,2-propyleneglycol in compositions of the present invention was evaluated against that of comparative compositions comprising poly-1,2-propyleneglycol having a molecular weight outside that required in the present invention.

The following inventive and comparative liquid hand dishwashing detergent compositions were prepared by mixing together of the individual raw materials at room temperature using a batch type process.

Comparative examples A to C and examples 1 to 4 of the invention had a surfactant system which comprised linear alkyl sulfate as the anionic surfactant, and amine oxide amphoteric surfactant as the co-surfactant. Comparative example A was used as the reference and comprised no polypropylene glycol. Comparative example B comprised poly-1,2-propylene glycol of weight average molecular weight 425 g/mol, below that required for compositions of the present invention. Comparative example C comprised poly-1,2-propylene glycol of weight average molecular weight 2000 g/mol, above that required for compositions of the present invention. Examples 1 to 4 comprised poly-1,2-propylene glycol of weight average molecular weight from 725 g/mol to 1650 g/mol, and hence were according to the invention.

As can be seen from the data below, formulating the liquid hand dishwashing composition with a polypropylene glycol having a molecular weight in the range required by the present invention results in a suds mileage which is more robust to the presence of greasy soils, even when the surfactant system is formulated with an alkyl sulfate anionic surfactant having little or no alkoxylation.

TABLE 2

Hand dishwashing detergent compositions of the present invention (Ex 1 to Ex 4, and comparative examples (Ex A to Ex C):

| wt % (as 100% active) | Ex A* | ExB | Ex 1 | Ex 2 | Ex 3 | Ex 4 | Ex C |
|---|---|---|---|---|---|---|---|
| Sodium lauryl sulfate[1] | 14.25 | 14.25 | 14.25 | 14.25 | 14.25 | 14.25 | 14.25 |
| C12-C14 dimethyl amine oxide | 4.75 | 4.75 | 4.75 | 4.75 | 4.75 | 4.75 | 4.75 |
| C9-11 EO8 nonionic surfactant[2] | 1.0 | 1.0 | 1.0 | 1.0 | 1.0 | 1.0 | 1.0 |
| Alkoxylated polyethyleneimine (PEI600EO24PO16)[3] | 0.23 | 0.23 | 0.23 | 0.23 | 0.23 | 0.23 | 0.23 |
| PPG (mw 425 g/mol)[4] | — | 2.0 | — | — | — | — | — |
| PPG (mw 725 g/mol)[4] | — | — | 2.0 | — | — | — | — |
| PPG (mw 1000 g/mol)[4] | — | — | — | 2.0 | — | — | — |
| PPG (mw 1200 g/mol)[4] | — | — | — | — | 2.0 | — | — |
| PPG (mw 1650 g/mol)[4] | — | — | — | — | — | 2.0 | — |
| PPG (mw 2000 g/mol)[4] | — | — | — | — | — | — | 2.0 |
| Ethanol | 1.8 | 1.8 | 1.8 | 1.8 | 1.8 | 1.8 | 1.8 |
| Water and minors | to 100% | to 100% | to 100% | to 100% | to 100% | to 100% | to 100% |
| pH (as 10% solution in demi water, trimmed with HCl) | 9.0 | 9.0 | 9.0 | 9.0 | 9.0 | 9.0 | 9.0 |
| Suds mileage in the presence of greasy soil | 100 | 107 | 116 | 116 | 117 | 115 | 109 |

*Reference
[1]Linear, Tensopol SLS29, supplied by Tensachem
[2]Neodol 91/8, supplied by Shell
[3]supplied by BASF
[4]Poly-1,2-propylene glycol (weight average molecular weight)

Comparative examples D to F and examples 5 to 8 of the invention had a surfactant system which comprised linear alkyl sulfate as the anionic surfactant, and betaine zwitterionic surfactant as the co-surfactant. Comparative example D was used as the reference and comprised no polypropylene glycol. Comparative example E comprised poly-1,2-propylene glycol of weight average molecular weight 425 g/mol, below that required for compositions of the present invention. Comparative example F comprised poly-1,2-propylene glycol of weight average molecular weight 2000 g/mol, above that required for compositions of the present invention. Examples 5 to 8 comprised poly-1,2-propylene glycol of weight average molecular weight from 725 g/mol to 1650 g/mol, and hence were according to the invention.

As can be seen from the data below, the improvement in suds mileage in the presence of greasy soils is also present when the detergent composition is formulated with a betaine zwitterionic co-surfactant instead of an amine oxide amphoteric surfactant.

TABLE 3

Hand dishwashing detergent compositions of the present invention (Ex 5 to Ex 8, and comparative examples (Ex D to Ex F):

| wt % (as 100% active) | Ex D* | Ex E | Ex 5 | Ex 6 | Ex 7 | Ex 8 | Ex F |
|---|---|---|---|---|---|---|---|
| Sodium lauryl sulfate[1] | 14.25 | 14.25 | 14.25 | 14.25 | 14.25 | 14.25 | 14.25 |
| Cocoamidopropyl betaine | 4.75 | 4.75 | 4.75 | 4.75 | 4.75 | 4.75 | 4.75 |
| C9-11 EO8 nonionic surfactant[2] | 1.0 | 1.0 | 1.0 | 1.0 | 1.0 | 1.0 | 1.0 |
| Alkoxylated polyethyleneimine (PEI600EO24PO16)[3] | 0.23 | 0.23 | 0.23 | 0.23 | 0.23 | 0.23 | 0.23 |
| PPG (mw 425 g/mol)[4] | — | 2.0 | — | — | — | — | — |
| PPG (mw 725 g/mol)[4] | — | — | 2.0 | — | — | — | — |
| PPG (mw 1000 g/mol)[4] | — | — | — | 2.0 | — | — | — |
| PPG (mw 1200 g/mol)[4] | — | — | — | — | 2.0 | — | — |
| PPG (mw 1650 g/mol)[4] | — | — | — | — | — | 2.0 | — |
| PPG (mw 2000 g/mol)[4] | — | — | — | — | — | — | 2.0 |
| Ethanol | 1.8 | 1.8 | 1.8 | 1.8 | 1.8 | 1.8 | 1.8 |
| Water and minors | to 100% | to 100% | to 100% | to 100% | to 100% | to 100% | to 100% |
| pH (as 10% solution in demi water, trimmed with HCl) | 9.0 | 9.0 | 9.0 | 9.0 | 9.0 | 9.0 | 9.0 |
| Suds mileage in the presence of greasy soil | 100 | 119 | 133 | 132 | 125 | 115 | 104 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing cleaning composition comprising:

from about 5% to about 50% by weight of the total composition of a surfactant system, wherein the surfactant system comprises:

at least about 40% by weight of the surfactant system of anionic surfactant, wherein the anionic surfactant comprises at least about 50% by weight of the anionic surfactant of alkyl sulfate anionic surfactant, wherein the alkyl sulfate anionic surfactant:

has an alkyl chain comprising an average of from 8 to 18 carbon atoms;

has an average degree of branching of less than about 15%, and is free of alkoxylation; and a co-surfactant selected from the group consisting of an amphoteric surfactant, a zwitterionic surfactant and mixtures thereof;

from about 0.3 to about 5.0% by weight of the total composition of polypropyleneglycol, wherein the polypropyleneglycol comprises poly-1,2-propyleneglycol and has a weight average molecular weight from about 500 g/mol to about 1800 g/mol; and from about 50% to about 85% water by weight of the total composition.

2. The composition according to claim 1, wherein the liquid hand dishwashing cleaning composition comprises from about 8% to about 45% by weight of the total composition of the surfactant system.

3. The composition according to claim 1, wherein the surfactant system comprises from about 45% to about 90% by weight of the surfactant system of the anionic surfactant.

4. The composition according to claim 1, wherein the alkyl sulfate anionic surfactant has an alkyl chain comprising an average of from 12 to 13 carbon atoms.

5. The composition according to claim 1, wherein the anionic surfactant comprises at least about 70% by weight of the anionic surfactant of alkyl sulfate anionic surfactant.

6. The composition according to claim 5, wherein the anionic surfactant comprises at least about 90% by weight of the anionic surfactant of alkyl sulfate anionic surfactant.

7. The composition according to claim 1, wherein the alkyl sulfate anionic surfactant consists of linear alkyl sulfate anionic surfactant.

8. The composition according to claim 7, wherein the linear alkyl sulfate surfactant comprises alkyl chains which are naturally derived.

9. The composition according to claim 7, wherein the surfactant system comprises a nonionic surfactant, wherein the nonionic surfactant comprises alkyl polyglucoside nonionic surfactant.

10. The composition according to claim 1, wherein the polypropyleneglycol has a weight average molecular weight from about 600 g/mol to about 1500 g/mol.

11. The composition according to claim 10, wherein the polypropyleneglycol has a weight average molecular weight from about 700 g/mol to about 1300 g/mol.

12. The composition according to claim 1, wherein the polypropyleneglycol consists of poly-1,2-propyleneglycol.

13. The composition according to claim 1, wherein the co-surfactant is an amphoteric surfactant which is an amine oxide surfactant selected from the group consisting of: alkyl dimethyl amine oxide, alkyl amido propyl dimethyl amine oxide, and mixtures thereof.

14. The composition according to claim 1, wherein the weight ratio of anionic surfactant to the co-surfactant is from about 1:1 to about 8:1.

15. The composition according to claim 1, wherein the weight ratio of anionic surfactant to the co-surfactant is from about 2.5:1 to about 4:1.

* * * * *